(12) United States Patent
Gadhok

(10) Patent No.: US 6,304,359 B1
(45) Date of Patent: Oct. 16, 2001

(54) HIGH SCAN EFFICIENCY GALVANOMETRIC LASER SCANNING DEVICE

(75) Inventor: Jagmohan S. Gadhok, Windsor, CA (US)

(73) Assignee: Lasesys Corporation, Santa Rosa, CA (US)

( * ) Notice: Subject to any disclaimer, the term of this patent is extended or adjusted under 35 U.S.C. 154(b) by 0 days.

(21) Appl. No.: 09/357,611

(22) Filed: Jul. 20, 1999

(51) Int. Cl.$^7$ .................................................. G02B 26/08
(52) U.S. Cl. .............................. 359/198; 359/199; 310/36
(58) Field of Search ................................. 359/198–200, 359/212–214; 310/36, 40 R, 90.5

(56) References Cited

U.S. PATENT DOCUMENTS

| 4,512,626 | * | 4/1985 | Kamiya et al. ........................ 359/200 |
| 4,726,640 | * | 2/1988 | Iwama et al. ......................... 359/200 |
| 4,732,440 | | 3/1988 | Gadhok . |
| 4,861,125 | | 8/1989 | Vaught . |
| 5,177,631 | | 1/1993 | Orlicki et al. ........................ 359/214 |
| 5,221,933 | | 6/1993 | Chandler et al. ..................... 346/109 |
| 5,280,377 | | 1/1994 | Chandler et al. ..................... 359/196 |
| 5,371,347 | | 12/1994 | Plesko ................................. 235/467 |
| 5,469,291 | | 11/1995 | Plesko ................................. 359/224 |
| 5,519,198 | | 5/1996 | Plesko ................................. 235/462 |
| 5,525,764 | | 6/1996 | Junkins et al. ........................ 178/18 |
| 5,525,766 | | 6/1996 | Atcheson et al. ..................... 181/30 |
| 5,596,442 | | 1/1997 | Plesko ................................. 359/199 |
| 5,656,805 | | 8/1997 | Plesko ................................. 235/472 |
| 5,698,835 | | 12/1997 | Dvorkis et al. ....................... 235/472 |
| 5,778,133 | | 7/1998 | Plesko ................................. 385/146 |
| 5,982,521 | | 11/1999 | Bessho et al. ........................ 359/198 |
| 6,008,924 | | 12/1999 | Ikegame .............................. 359/198 |

* cited by examiner

Primary Examiner—James Phan
(74) Attorney, Agent, or Firm—Skjerven Morrill MacPherson LLP; Peter H. Kang; Michael J. Halbert

(57) ABSTRACT

An optical scanning device for raster scanning applications based on galvanometric scanner technology incorporates a nonlinear biasing element, such as a nonlinear magnetic or mechanical spring to assist in the acceleration and deceleration of the motor shaft at the turn around points of the sawtooth motion. The galvanometric scanning device includes a moving magnet motor using more than four poles, e.g., eight poles. The moving magnet motor has a plurality of laminations each having a number of teeth, e.g., eight, extending inward toward the rotor and having coils mounted thereon. In one embodiment, coils are mounted on every other tooth. The motor is driven with a fourth order polynomial sawtooth command signal to reduce resonances caused by high acceleration and deceleration. In addition, the motor may be driven by pulse width modulation to reduce power dissipation. The positioning sensor mirror is coupled to the back of the scanning mirror to reduce structural resonance between the positioning sensor mirror and the scanning mirror. The positioning sensor mirror may be mounted on the scanning mirror or may be integrally formed on the back of the scanning mirror, e.g., by polishing. The rotor and scanning mirror are supported by only two bearings, one bearing supporting the rotor and an outboard bearing supporting the scanning mirror, which advantageously reduces cross axis wobble.

20 Claims, 8 Drawing Sheets

HIGH SCAN EFFICIENCY GALVANOMETRIC LASER SCANNING DEVICE

FIELD OF THE INVENTION

The present invention relates to an optical scanning system for raster scanning applications, and in particular to a galvanometric scanner.

BACKGROUND

The use of lasers in manufacturing, science, medicine, communication, and entertainment has grown rapidly throughout the industrialized world. For many of the laser-based technologies, an optical scanner is required to deflect the beam in a controlled fashion to follow a defined path. One commonly used type of scanning application is raster scanning, in which a deflection device moves a laser beam at constant velocity during an active portion of the scan cycle, then quickly returns the beam to the starting point to begin the next scan cycle. FIG. 1 shows a conventional sawtooth function used as a raster scanning system, where the x axis represents time and the y axis represents displacement. As shown in FIG. 1, the raster scan includes an active scan time $t_{ACT}$, a return scan time $t_{RET}$, and a cycle time $t_{CYC}$. The ratio of the active scan time $t_{ACT}$ and the cycle time $t_{CYC}$ is called the duty cycle. High speed and high-duty cycle sawtooth scanning is desirable to meet the needs of many emerging technologies such as laser projection high-definition television and digital projection systems for movie theaters.

For raster scanning, the scan frequency translates to the number of frames per second which are projected onto the screen. The higher the number of frames per second, the better the quality of the observed image due to reduced flicker. Standard television images operate at 30 frames per second, while 60 to 90 frames per second are required for high definition television (HDTV). The motion picture industry uses 24 frames per second, but for digital projection systems 72 to 96 frames per second would be required.

There are at least six types of laser scanning technologies in use; resonant, electro-optic, acousto-optic, polygon, holographic, and galvanometric. However, each of these technologies has limitations which prevent their use in many of the emerging applications. For example, the resonant scanner can provide a line scan at high frequency and stability, but the scanned beam moves in a sinusoidal fashion, providing a nonlinear spot velocity and low duty cycle. Electro-optic and acousto-optic scanners can provide very high duty cycles and scan rates, but only small amplitudes are available. In addition, electro-optic and acousto-optic scanners suffer from a significant loss of laser power through the device. Multifaceted polygon scanners can achieve high scanning speeds, but they suffer from beam positioning errors due to facet-to-facet errors and a low-duty cycle for large aperture beams. Multifaceted holographic scanners can be designed to overcome the beam positioning errors of the polygon scanners, but they still provide low duty cycle for large aperture beams and suffer from loss of laser power through the device.

Galvanometric scanning technologies provide the best solution. A galvanometric scanner (galvo) is a limited rotation DC torque motor with an integral position sensor. Beam deflection optics, such as a mirror, are attached to a motor shaft, which can be moved under servo control to direct a laser beam to follow a command signal. The galvo combines the advantages of a single mirror surface, which gives consistent light reflectivity, low cycle-to-cycle error, and small package size.

While galvo beam steering technology has the capability of achieving high duty cycle raster scanning, conventional galvos are inadequate for the high speed and high-duty cycle sawtooth scanning required for many new technologies.

There are three conventional types of galvo motor designs used in the industry: moving coil, moving iron, and moving magnet. A moving coil design is based upon the d'Arsonval galvanometer design where the coil is supported by aluminum struts attached to a center shaft which runs the length of the rotor. A biasing magnetic field is produced around the rotor coil. When current flows through the coil, the rotor generates a torque proportional to the current. This type of scanner can generate high torque, but heat dissipation from the coil limits their performance. Also a flexible wire connection must be provided to the moving coil which can limit its long term reliability.

A moving iron motor has a stator which has stationary coils with biasing permanent magnets. The magnets produce a magnetic flux across the gap between the stator and a soft iron rotor. When the current flows through the stator coil, a control flux is created in the same air gap. This control flux interacts with the biasing flux to generate the drive torque in the rotor. Moving iron galvo motors have a simple construction and good heat conduction path from the coil to the heat sink. However, the gap between the rotor and stator has to be very small, less than 0.005 inch, to generate high torque. Further, the torque output is very sensitive to the gap, which results in large variation in motor torque due to manufacturing tolerances.

Currently available galvo systems use the moving magnet design. FIG. 2 shows a cross sectional view of a moving magnet motor 10 having a conventional two pole design. The moving magnet motor 10 includes two magnets 12 and 14 positioned on the rotor 16 to provide the two pole design. A control coil 18 is cemented on the inside of a soft iron cylinder 20 connected to the motor case (not shown). The control coil 18 surrounds the rotor 16. Conventional galvo systems use linear servo controllers to drive the moving magnet motor 10.

Moving magnet motor 10 is a conventional inside-out d'Arsonval design that works with larger air gaps. Consequently, motor 10 is not sensitive to manufacturing tolerances. While the heat dissipation and torque constant of the moving magnet design is not as good as that found in the moving iron design, the inductance is lower in the moving magnet design, which permits faster rise of current in the coil and, thus, higher acceleration capability.

For a conventional two pole moving magnet motor, such as that shown in FIG. 2, the torque output from the motor is:

$$T = \text{torque (Newton meters)} = B_g L I N_s D_r \qquad \text{eq. 1}$$

where:

$B_g$=air gap flux density (Tesla);

L rotor length (meter);

$N_s$=Number of coil turns;

I =Coil current (amps); and $D_r$=Rotor diameter (meter).

Conventional galvo scanners use a capacitive position sensor attached at one end of the rotor shaft. The torsional stiffness between the load, i.e., the mirror, and the position sensor can cause unwanted structural resonances that result in jitter in the scanned beam. The jitter causes a loss of resolution in the system along with increased image distortion. Loss of resolution and increased image distortion are particularly unacceptable in laser based video projection systems.

Thus, there is a need for a galvo system that provides high-duty cycle sawtooth scanning at high scan rates, and large scan angle to meet the demands of the emerging laser based technologies and products.

SUMMARY

An optical scanning device for raster scanning applications based on galvanometric scanner technology incorporates a moving magnet motor with a rotor having at least four poles, e.g., eight poles. A scanning mirror is mounted on the rotor. The scanning mirror and the rotor have approximately the same inertia. The motor has a plurality of laminations mounted in a stator. Each lamination includes a body with a plurality of teeth, e.g., eight teeth, positioned radially around the body and extending inward toward the center of the body. The rotor extends through the center of the laminations. Coils are mounted on the teeth. In some embodiments, coils are mounted only on every other tooth, which permits an increased packing density. Such a motor provides a high torque-to-inertia ratio.

The motor is driven with a fourth order polynomial sawtooth command signal to reduce resonances caused by high acceleration and deceleration. In addition, the motor may be driven by pulse width modulation to reduce power dissipation.

The rotor and the scanning mirror are supported by only two bearings. A first bearing supports the rotor and a second bearing, which is an outboard bearing supports the mirror, which advantageously reduces cross axis wobble.

A positioning sensor mirror is coupled to the back of the scanning mirror to reduce structural resonance between the positioning sensor mirror and the scanning mirror. The positioning sensor mirror may be mounted on the scanning mirror or may be integrally formed on the back of the scanning mirror, e.g., by polishing.

A galvanometric scanning device, in accordance with another embodiment of the present invention, uses a nonlinear biasing element to assist in the acceleration and deceleration of the motor shaft at the turn around points of the sawtooth motion. The nonlinear biasing element may be a magnetic spring which includes a bar mounted to the rotor a, first pair of magnets coupled to an end of the bar on opposing sides, and a second pair of magnets coupled to the other end of the bar on opposing sides. A first pair of stationary magnets opposes the first pair of magnets. Likewise, a second pair of stationary magnets oppose the second pair of magnets.

In another embodiment, the nonlinear biasing element is at least one nonlinear mechanical spring. The mechanical spring, e.g., includes a cantilever member that is mounted on a stationary shaped clamp. As the cantilever member is deflected it contacts the shaped clamp, thereby effectively shortening the length of the cantilever member. The cantilever member has an "S" shape and is mounted to a second shaped clamp that is mounted to the rotor. Two opposing mechanical springs may be used.

With a galvanometric scanning device, in accordance with the present invention, high-duty cycle and optical efficiency at high raster scanning speeds are possible. Duty cycles in excess of ninety percent (90%) at scan rates in the range of ninety to two hundred cycles per second (90 to 200 Hz) are achievable with large mirror apertures and large scan angles. Consequently, the index of performance for raster scanning of optical beams can be improved by a factor of four to ten.

DETAILED DESCRIPTION

A galvo scanner in accordance with an embodiment of the present invention includes a multi-pole moving magnet limited rotation motor design with a coil configuration optimized for limited rotation motors. The galvo scanner includes a nonlinear stiffening spring to assist in achieving a high duty cycle raster scan. The galvo scanner may also include an electro-optic position sensor that reduces jitter and a servo controller that uses pulse width modulation technology to reduce power requirements and is controlled by a polynomial sawtooth command signal to minimize sudden changes in velocity and acceleration.

Figure 3:
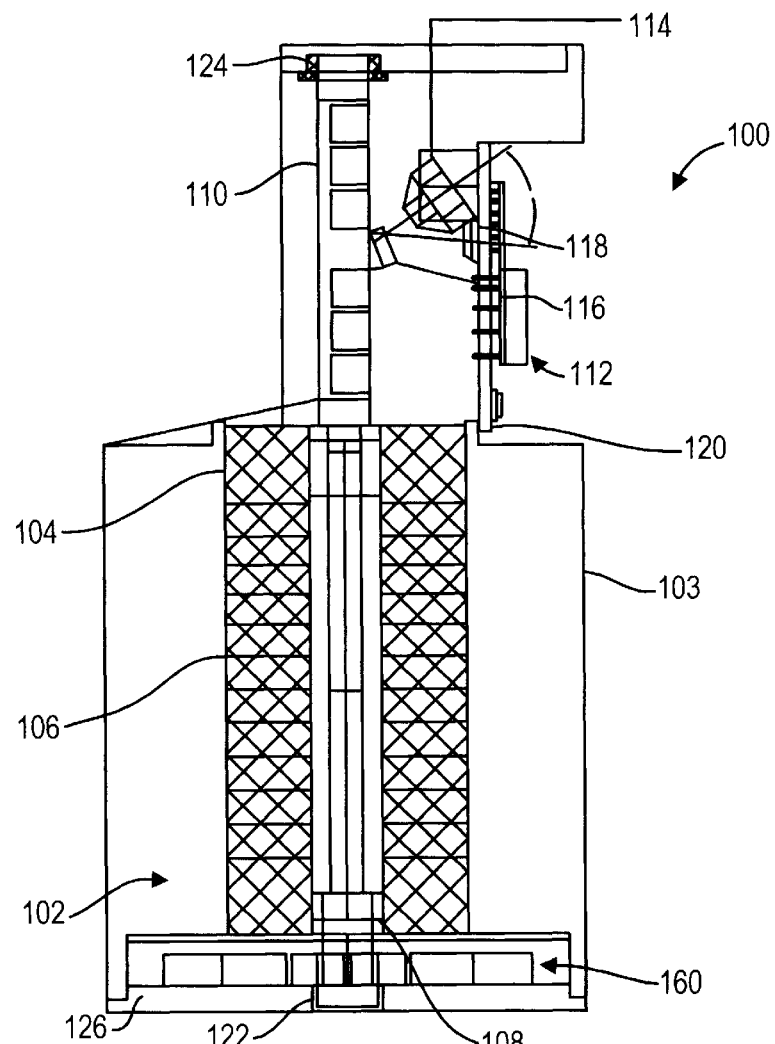
FIG. 3 shows a side view of a galvanometric scanning device, in accordance with an embodiment of the present invention.
Figure 4:
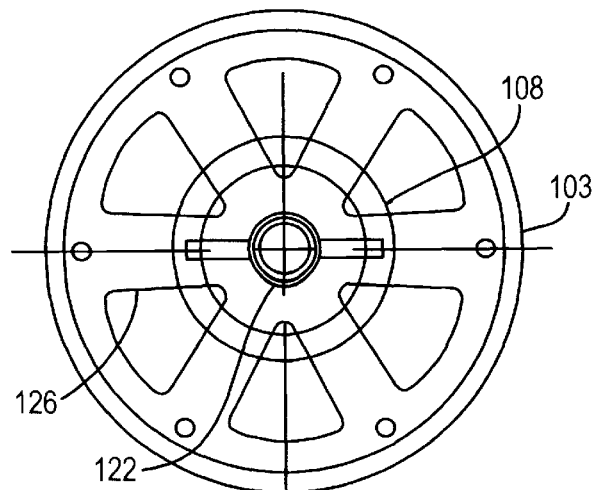
FIG. 4 shows a bottom view of a galvanometric scanning device with a spider spring clamped and a bearing mounted in the center of the spider spring.

FIGS. 3 and 4 shows a respective side view and bottom view of a galvo scanner 100 in accordance with an embodiment of the present invention. Galvo scanner 100 includes a moving magnet motor 102 within the scanner frame 103. The moving magnet motor 102 includes a stator 104, a number of laminations 106, and a rotor 108. Mounted on the rotor 108 is a scanning mirror 110, shown in side view in FIG. 3. A positioning sensor device 112 that determines the position of scanning mirror 110, includes a light source 114, such as an LED, a positioning sensor mirror 116, and a position senstive light detector 118. The positioning sensor electronics 120 for the positioning sensor device 112 are shown mounted on the scanner frame 103. A spider spring 126 is shown at the base of galvo scanner 100 to support bearing 122. Further, a nonlinear biasing element 160 is shown at the base of galvo scanner 100.

Structural resonance in the scanning mirror 110 and between the scanning mirror 110 and the position sensor device 112 can cause small variations in the spot velocity during the active portion of the scan cycle. These small variations in the spot velocity are known as jitter and result in non-repeatable position errors in the scan direction. The position errors are typically expressed as the standard deviation of the maximum jitter error observed in each scan line over a large number of consecutive scans. For high resolution imaging systems, such as HDTV projection systems, the jitter errors must be less than one fourth of a pixel, otherwise excessive degradation of the image is observed.

Figure 5:
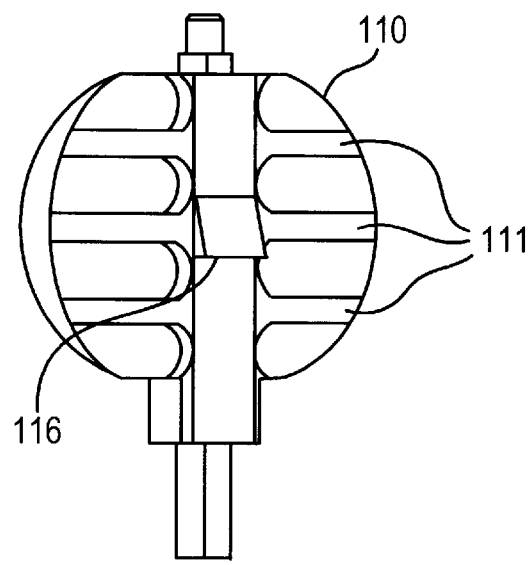
FIG. 5 shows a perspective view of the back side of the scanning mirror with a positioning sensor mirror coupled thereto.

To avoid jitter, dynamic stiffness of the scanning mirror 110 must be carefully controlled, along with stiffness between the scanning mirror 110 and positioning sensor device 112. The scanning mirror 110 is designed to have the highest stiffness-to-inertia ratio possible. FIG. 5 shows a perspective view of the back side of the scanning mirror 110. Scanning mirror 110 is made of a stiff material, e.g., beryllium. Further, scanning mirror 110 includes ribbed structures 111 to increase the stiffness of scanning mirror 110. For forward looking imaging systems, the amount of light collected from the scene is directly proportional to the area of the scanning mirror 110 and its reflectivity. For high intensity laser projection systems, the beam aperture on the mirror is kept large to achieve a small spot size and to reduce the energy density on the scanning mirror 110, thereby preventing mirror coating damage.

The positioning sensor mirror 116 is coupled to the back of scanning mirror 110 and is used to deflect the position sensor member from light source 114 to light detector 118. Positioning sensor mirror 116 may be mounted to the back of scanning mirror 110, for example with epoxy, or in another embodiment, positioning sensor mirror 116 may be integrally formed on the back of scanning mirror 110 by polishing the back of scanning mirror 110. If positioning sensor mirror 116 is integrally formed on the back of scanning mirror 110, the positions of either light source 114 or light detector 118, or both, may be appropriately altered so that the light member from light source 114 is received by position sensitive light detector 118. Conventional galvo scanners mount the positioning sensor mirror on the rotor, which results in structural resonance between the scanning mirror and the positioning sensor mirror. By mounting the positioning sensor mirror 116 on the back of scanning mirror 110, galvo scanner 100 advantageously eliminates the effect of structural resonance on the position sensor signal.

The positioning sensor device 112 is an electro-optic position sensor, such as the type described in U.S. Pat. No. 5,525,764, entitled "Laser Scanning Graphic Input System," which is incorporated herein by reference.

As shown in FIG. 3, the rotor 108 and scanning mirror 110 structures are supported by two bearings 122 and 124, respectively. One end of rotor 108 is supported by bearing 122 and the opposite end of the rotor 108 is connected to one side of the scanning mirror 110. The opposite side of the scanning mirror 110 is supported by outboard bearing 124.

Conventionally, galvo scanners include bearings mounted in the stator at both ends of the rotor, and sometimes include a third bearing to support the mirror. However, the use of three bearings overly constrains the rotor and mirror structure. If the rotor and mirror structure is slightly misaligned, the bearings will degrade quickly. The use of two bearings 122 and 124 at either end of the rotor 108 and scanning mirror 110 structure in accordance with an embodiment of the present invention advantageously reduces cross axis wobble and improves the degradation rate.

Bearings 122 and 124 are high precision ceramic bearings, such as part number SERIF-5632ZZEERA 7P25L01, which may be purchased from New Hampshire Bearing, Inc. Or course, other appropriate bearings may alternatively be used.

To further reduce cross axis wobble, bearing 122 is preloaded with a spider spring. FIG. 4, which is a bottom view of galvo scanner 100, shows a spider spring 126 clamped at the base of frame 103 with bearing 122 mounted in the center of spider spring 126. When moving magnet motor 102 is positioned in frame 103 with rotor 108 being inserted into bearing 122, spider spring 126 will be deflected downward, thereby preloading bearing 122.

Figure 6:
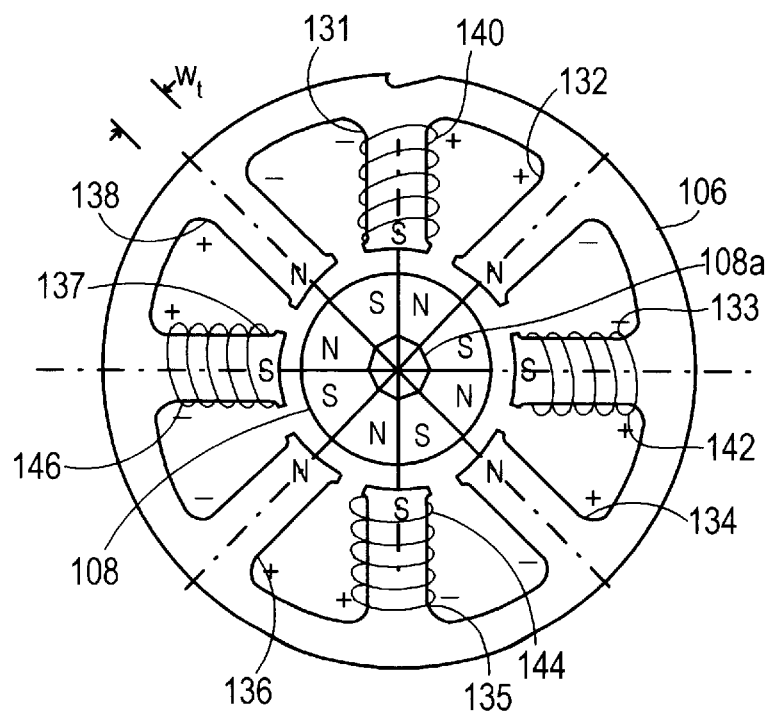
FIG. 6 shows a top plan view of a single lamination with eight teeth and with the rotor extending through the center.

As shown in FIG. 3, moving magnet motor 102 includes a number of laminations 106, e.g., one hundred laminations 106. FIG. 6 shows a top plan view of a single lamination 106 with rotor 108 in the center. Lamination 106 is an eight-pole design having eight teeth 131–138. The body of lamination 106 is made of M19 silicon steel, or another appropriate material, e.g., Hyperco, which is a high cobalt nickel alloy, or Hiperm, which is a high nickel alloy, both of which are manufactured by Carpenter Technology in Reading, Pennsylvania. Lamination 106 is approximately one inch in diameter and 0.015 inches thick, and each tooth has a width $W_t$ of approximately 0.1 inch. The gap between rotor 108 and the end of each tooth is approximately 0.020 inches.

Lamination 106 includes four coils 140, 142, 144, and 146, each having a number of turns, e.g., approximately 120 turns of 31 gauge type M copper wire. The number of turns per coil affects the torque of motor 102. Four coils are used with lamination 106 so that the desired packing density may be achieved and to simplify manufacturing. If desired, eight coils may be used, one for each tooth, however, the packing density may be undersirably small. Further, due to the small size of lamination 106, placing a coil on each tooth may be difficult. Thus, as shown in FIG. 6, coils 140, 142, 144, and 146 are wound around teeth 131, 133, 135, and 137, respectively.

Each separate lamination 106 is coated with an iron oxide coating to provide electrical insulation between the individual laminations when a plurality of laminations are stacked as shown in FIG. 3. This reduces eddy current losses in the lamination material. If lamination 106 is made of Hyperco or high nickel alloy, an additional epoxy coating may be used for insulation. The lamination stack is coated with epoxy to prevent damage to coil wire insulation.

Rotor 108 is approximately 0.35 inches in diameter. As shown in FIG. 6, rotor 108 includes eight magnets providing eight poles mounted around a shaft 108a. The pole, i.e., "N" or "S", indicated in FIG. 6 indicates the outward facing pole of the magnet, i.e., the pole facing teeth 131–138. Of course, the opposite pole, which is not indicated in FIG. 6, is facing the shaft of rotor 108a. A nonlinear biasing element, discussed below, is used to orient the rotor 108 in the shown neutral position when there is no current in the coils 140, 142, 144, and 146.

When the four coils 140, 142, 144, and 146 are supplied with current in the orientation shown in FIG. 6, a counter-clockwise torque is generated in rotor 108. Although only four coils are used, wound around teeth 131, 133, 135, and 137, respectively, teeth 132, 134, 136, and 138, are magnetized due to current flow in the coil wire bundles in their proximity, as shown in FIG. 6. Thus, it is unnecessary to place a coil on each tooth. Reversing the current in coils 140, 142, 144, and 146 generates a clockwise torque in the rotor 108.

Figure 7A:
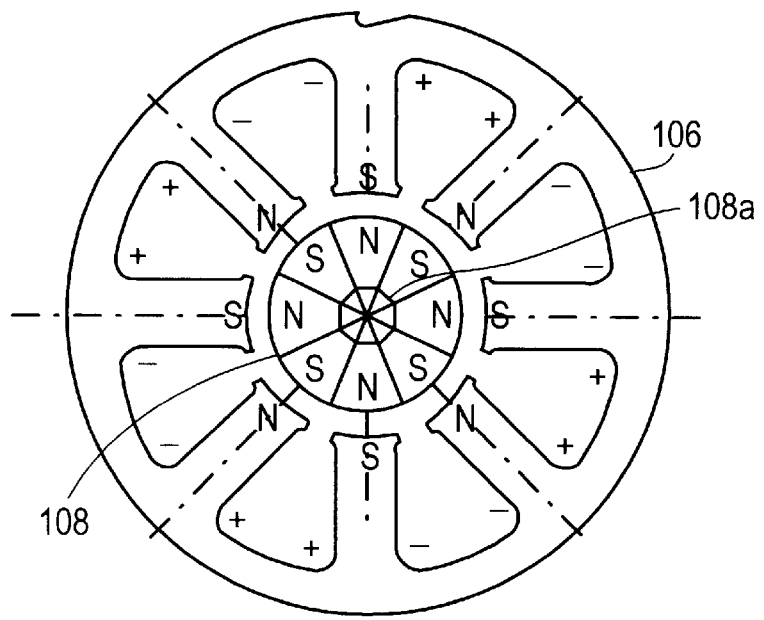
FIGS. 7A and 7B show the two phases of an eight pole limited rotation motor.
Figure 7B:
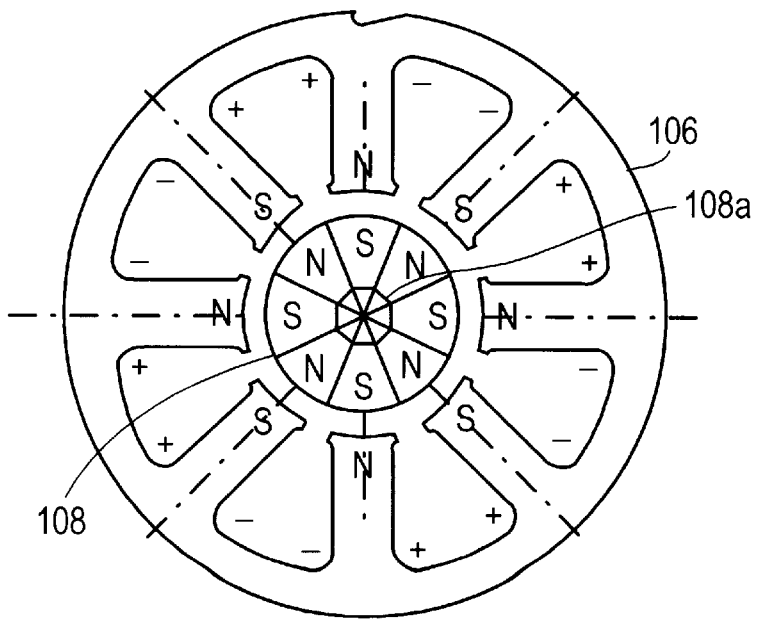

FIGS. 7A and 7B show the two phases of an eight pole limited rotation motor 102. Lamination 106 shown in FIGS. 7A and 7B, is similar to that shown in FIG. 6, however, no coils 140, 142, 144, and 146 are shown for the sake of clarity, and rotor 108 is shown rotated from the neutral position. The direction of current, however, is shown in FIGS. 7A and 7B, as is the polarity of each tooth. FIG. 7A shows rotor 108 rotated counter-clockwise from the neutral position (shown in FIG. 6). When the current in the coils is reversed, as shown in FIG. 7B, a clockwise torque is applied to the rotor 108. Thus, rotor 108 is rotated clockwise from the neutral position. The current in the coils is reversed again to apply a counter-clockwise torque on rotor, as shown in FIG. 7A. Thus, as shown in FIGS. 7A and 7B, a limited rotation of rotor 108 is applied by reversing the current in the coils. The maximum angular excursion from the neutral position has to be less than ±22.5 degrees mechanical to prevent rotor 108 from locking up.

Figure 8A:
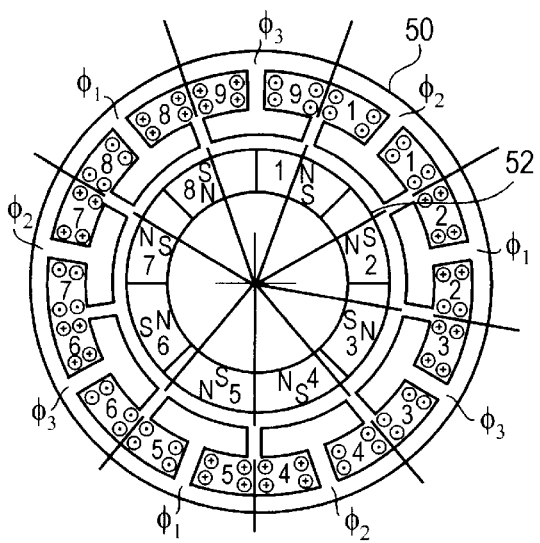
FIG. 8A shows a lamination of a conventional eight pole continuous rotation motor.
Figure 8B:
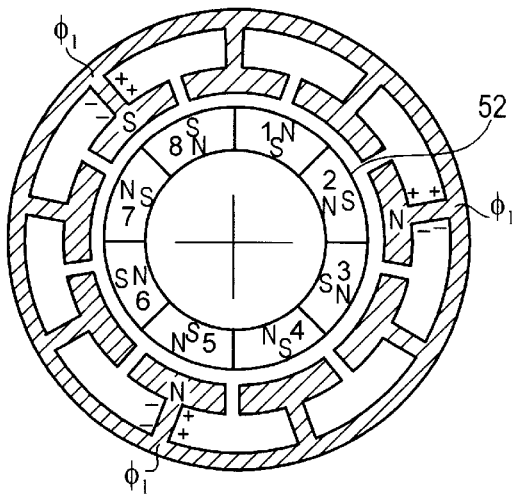
FIGS. 8B, 8C, and 8D show the three active phases of the continuous rotation motor shown in FIG. 8A.
Figure 8C:
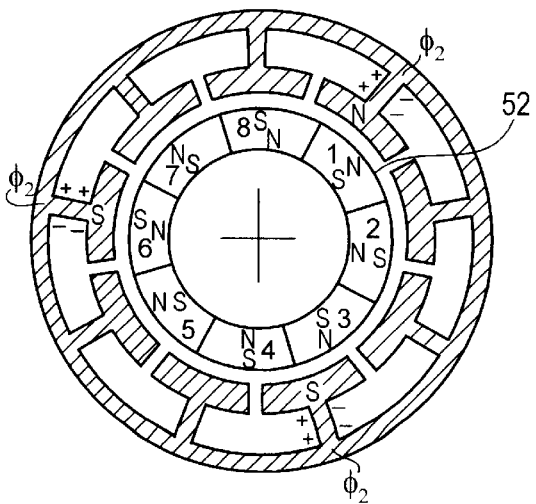
Figure 8D:
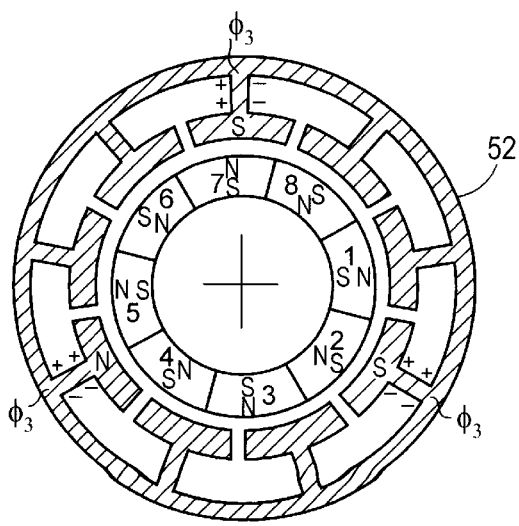

By way of comparison, FIG. 8A shows a lamination 50 of a conventional eight pole continuous rotation motor. FIGS. 8B, 8C, and 8D show the three active phases of such a continuous rotation motor.

FIG. 8A shows a lamination 50 having nine teeth, each having a coil that is wound as indicated and an eight pole rotor 52 that passes through lamination 50. The coils are not shown for the sake of clarity, but the direction of the windings are shown along the sides of each tooth. The coils are divided into three groups, θ1, θ2, and θ3. In a first phase, shown in FIG. 8B, the θ1 coils are energized as indicated, which produces a clockwise torque on rotor 52. In the next phase, shown in FIG. 8C, the θ2 coils are energized as indicated to continue the clockwise torque on rotor 52. The third phase, shown in FIG. 8D, the θ3 coils are energized to continue the clockwise torque on rotor 52. The three phases are continued sequentially thereby providing continuous rotation of rotor 52.

A key parameter in maximizing the performance of galvo scanner 100 is to have a high torque-to-inertia ratio of the moving magnet motor 102. For raster scanning galvo system 100, the performance index may be measured by the following:

$$\text{Performance Index} = \frac{\theta f D \eta K_t}{T c P V J_r} \qquad \text{eq. 2}$$

where:
 θ=scan angle-radians;
 f=scan rate-Hz;
 D=mirror aperture-cm;
 Tc=temperature rise-° C./ watt;
 η=duty cycle;
 $J_r$=rotor inertia-gm cm$^2$;
 $K_t$=torque constant-dyne cm / amp;
 P=power input-watts; and
 V=scanner volume-cm$^3$.

The torque-to-inertia ratio, i.e., Kt/Jr, of the motor 102 should be high to maximize the performance index.

For a multiple pole brushless DC motor, torque output is:

$$T = \frac{KB_r t m L I N_s D_r n_t}{1g + t_m} \qquad \text{eq. 3}$$

$$N_s = \frac{K_s(D_s - D_r)}{N_t d^2} [2(D_s + d_r) - W_t N_t] \qquad \text{eq. 4}$$

where:
 $B_r$=Magnet residual flux density;
 K=constant;
 L=Length of lamination stack=length of magnet;
 I =Current in the coils;
 $N_s$=No. of coil turns per slot;
 $N_t$=No. of teeth=No. of magnets in the rotor;
 $W_t$=Width of tooth;
 $K_s$=slot packing factor;
 $D_s$=Stator outside diameter;
 $D_r$=Stator inside diameter;
 d=wire diameter;
 $t_m$=radial thickness of magnet; and
 $l_g$=length of air gap.

$$\text{Torque constant } K_t = \frac{T}{I} = \frac{KB_r t m L I N_s D_r n_t}{1g + t_m} \qquad \text{eq. 5}$$

$$\text{Motor constant } K_m = \frac{K}{\sqrt{R}} \qquad \text{eq. 6}$$

where R is the coil resistance.

By using eight-tooth lamination 106, shown in FIG. 6, a very high torque-to-inertia ratio can be achieved. To prevent saturation in the lamination 106, the tooth width $W_t$ should be determined from the properties of the material used in lamination 106 and the flux density in the air gap.

An index of performance for a galvo motor used in a galvo system can be defined as:

$$M = \frac{K_t K_m I_p}{T_c J_r \tau} \qquad \text{eq. 7}$$

where:
 $K_t$=Torque constant of motor;
 $K_m$=Motor constant of motor;
 $I_p$=Peak current into motor;
 $T_c$=Thermal resistance—coil to case;
 $J_r$=Rotor Inertia; and
 τ=Electrical Time constant of motor.

The design of the eight pole moving magnet motor 102 may be applied to four pole and twelve pole motors as well. Table 1 below compares the performance of a four pole motor with an eight pole motor using the same inertia rotor, showing that the eight pole motor, such as that shown in FIG. 6, achieves approximately twice the torque-to-inertia ratio as the four pole motor. The performance of a conventional high performance galvo scanner motor is also included for the sake of comparison.

TABLE 1

| Parameter | Eight Pole Motor | Four Pole Motor | Conv. Motor |
| --- | --- | --- | --- |
| Torque Constant $K_t$ ($\times 10^4$ dyne cm/amp) | 116 | 60 | 23 |
| Rotor Inertia $J_r$ (gm cm$^2$) | 3.0 | 3.0 | 1.7 |
| Rated Angle θ (deg. optical) | ±20.0 | ±30.0 | ±30 |
| Coil Resistance R (ohms) | 4.6 | 4.6 | 1.5 |
| Coil Inductance 1 (μH) | 2033 | 2033 | 620 |
| Motor Constant $K_m$ (dyne cm $\times 10^4$/root watt) | 54.1 | 28.0 | 10.8 |
| Current Peak $I_p$ (amp) | 30.0 | 30.0 | 25 |
| Electrical Time τ (μ/sec) | 442 | 442 | 138 |
| Thermal Resistance Coil to Case degree $\tau_c$ (° C./watt) | 1.0 | 1.0 | 2.5 |
| Torque-to-Inertia Ratio (dyne $\times 10^4$/gm cm$^2$ amp) | 38.7 | 20.0 | 13.5 |
| Performance Index M (eq. 5) | 142.0 | 38.0 | 10.6 |

Figure 1:
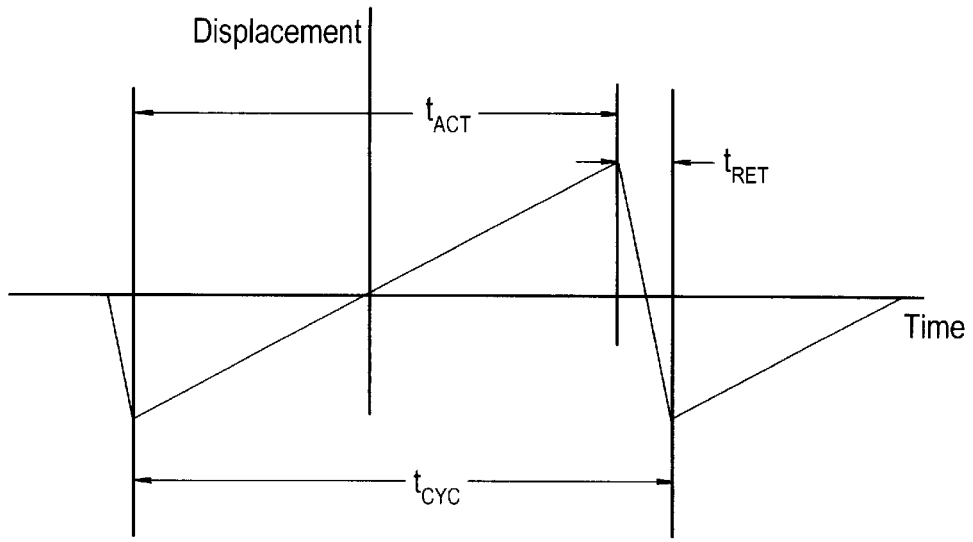
FIG. 1 shows a conventional sawtooth function used as a raster scanning system, where the x axis represents time and the y axis represents displacement.
Figure 2:
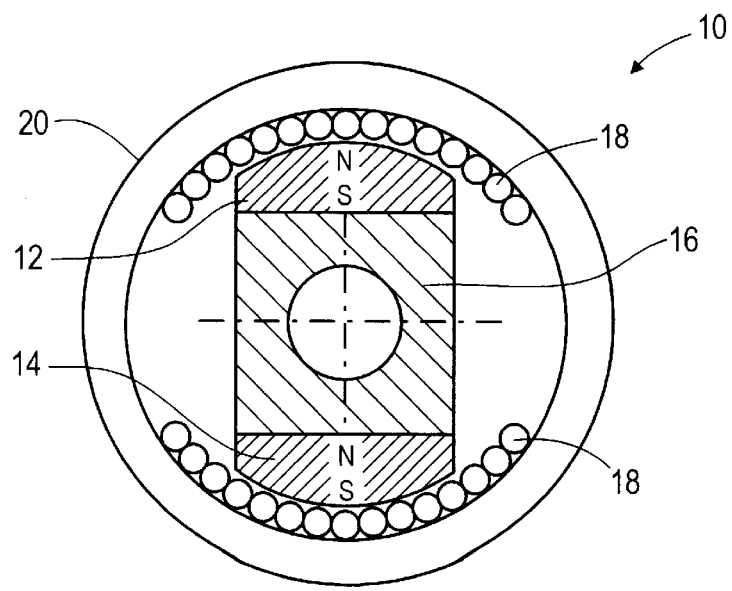
FIG. 2 shows a cross sectional view of a moving magnet motor having a conventional two pole design.

To achieve a high-duty cycle, the return scan time $t_{RET}$, as shown in FIG. 1, needs to be minimized. To minimize the return scan time $t_{RET}$, the motor 102 needs a high torque-to-inertia ratio to provide the high acceleration and deceleration for the return portion of the cycle.

When a galvo scanner is driven to follow a pure sawtooth command, such as that shown in FIG. 1, the sudden change in direction between the active scan times $t_{ACT}$ and the return scan times $t_{RET}$ requires an infinite acceleration at the turn around point. A large acceleration can excite resonances in the scanning mirror 110 and the rotor 108 which result in jitter in the scanning beam.

Figure 9:
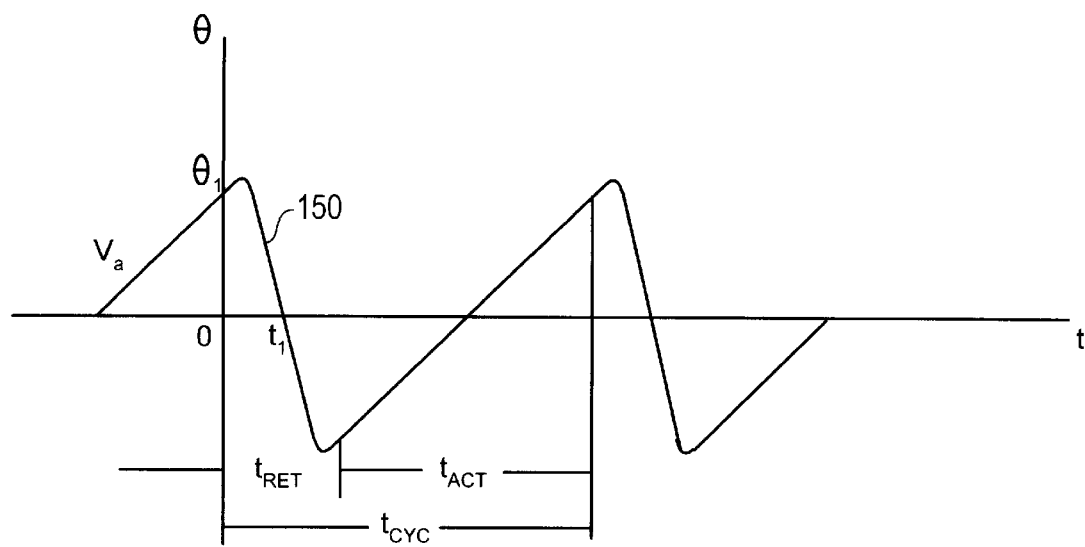
FIG. 9 shows a polynomial sawtooth command signal used to drive the motor in accordance with an embodiment of the present invention, where the x axis represents time and the y axis represents displacement in radians.

By properly modifying the sawtooth command signal to the motor 102 at the turn around points, the resonances in the scanning mirror 110 and rotor 108 advantageously can be minimized. FIG. 9 shows a sawtooth command signal 150 that is used to drive motor 102 in accordance with an embodiment of the present invention, where the x axis represents time and the y axis represents displacement in radians. As shown in FIG. 9, sawtooth command signal 150 is a continuous command function. Sawtooth command signal 150 should match the position, velocity, and acceleration of scanning mirror 110 between the active and return portions to minimize the sudden change in velocity and acceleration at the turn around points, i.e., between the active scan time $t_{ACT}$ and the return scan time $t_{RET}$. Thus, a polynomial, a cycloid fit, or other appropriate continuous command function may be used.

A fourth order polynomial fit is used to produce sawtooth command signal 150:

$$\theta = a_0 + a_1 t + a_2 t^2 + a_3 t^3 + a_4 t^4 \quad \text{eq. 8a}$$

$$d\theta/dt = a_1 + 2a_2 t + 3a_3 t^2 + 4a_4 t^3 \quad \text{eq. 8b}$$

$$d^2\theta/dt^2 = 2a_2 + 6a_3 t + 12a_4 t^2 \quad \text{eq. 8c}$$

$$d^3\theta/dt^3 = 6a_3 + 24a_4 t \quad \text{eq. 8d}$$

Referring to FIG. 9, boundary conditions are:

$$\text{at } t = 0; \theta = \theta 1; \frac{d\theta}{dt} = V_a; d^2\theta/dt^2 = 0 \quad \text{eq. 8e}$$

$$\text{at } t = t1, \theta = 0, d^2\theta/dt^2 = 0 \quad \text{eq. 8f}$$

where $\theta_1$, $V_a$, t1 are specified for the sawtooth command signal 150 under consideration. The five coefficients for the polynomial can be solved from the five equations which satisfy the boundary conditions.

By way of a simple example to get a rough estimate of the motor torque required from motor 102, we can use a $2^{nd}$ order polynomial, i.e., constant acceleration and deceleration. The polynomial fit for the return scan time is to match the position and velocity at the end and beginning of active scan time. Since the acceleration and deceleration cycles are mirror images, we can consider the half return scan time $t_{RET}$.

$$\theta = a_0 + a_1 t + a_2 t^2 \quad \text{eq. 9a}$$

$$\frac{d\theta}{dt} = a_1 + 2a_2 t \quad \text{eq. 9b}$$

$$\frac{d^2\theta}{dt} = 2a_2 \quad \text{eq. 9c}$$

The boundary conditions are:

$$\text{at } t = 0; \theta = \theta 1 \text{ and } \frac{d\theta}{dt} = V_a \quad \text{eq. 9d}$$

$$\text{at } t = t_1; \theta = 0 \quad \text{eq. 9e}$$

The following parameters may be assumed:

Scan frequency f=96 Hz;

Duty cycle=90%;

Active scan angle=28 deg. optical=14° mech. =0.24435 rad.;

Mirror inertia=3.0 gm cm$^2$;

Rotor inertia=3.0 gm cm$^2$;

Duty cycle time $t_{CYC}=1/96=10.4\times10^{-3}$ sec.;

Return scan time $t_{RET}=0.1t_{CYC}=1.04\times10^{-3}$ sec.;

Active scan time $t_{ACT}=(10.40-1.040)\times10^{-3}=9.36\times10^{-3}$ sec.; and $$\text{Mirror velocity } V_a = \frac{d\theta}{dt} = \frac{.24435}{9.36 \times 10^{-3}} = 26.06 \text{ rad./sec.}$$

By substituting the boundary condition and solving the equations, the equation of motion during the first half of the return scan time $t_{RET}$ is:

$$\theta = 0.12217 + 26.06t + 5 \times 10^6 t^2 \quad \text{eq. 10a}$$

$$\text{Acc.} = \text{Dec.} = 2a_2 = 2 \times 0.5 \times 10^6 = 1 \times 10^6 \text{rad/sec}^2 \quad \text{eq. 10b}$$

To achieve the highest acceleration, the rotor inertia should be close to the scanning mirror inertia, and is ideally the same. If the inertia of the rotor 108 is much greater than the inertia of scanning mirror 110, then the motor 102 is expending a large amount of energy to drive the rotor 108. On the other hand, if the inertia of the scanning mirror 110 is much greater than the inertia of the rotor 108, the rotor 108 is too small resulting in the motor 102 being under powered. Thus, to drive a mirror inertia of 3 gm cm$^2$, the optimum rotor inertia should be 3 gm cm$^2$. The peak motor torque requirement is:

$$T = J \frac{d^2\theta}{dt^2} \qquad \text{eq. 11a}$$

$$T = 6 \times 1 \times 10^6 = 6 \times 10^6 \text{ dyne cm} \qquad \text{eq. 11b}$$

where J is the combined inertia for the scanning mirror 110 and the rotor 108. Thus, for a motor with a torque constant of $0.3 \times 10^6$ dyne cm per amp., the peak drive current will be 20 amps.

Thus, the design of eight pole moving magnet motor 102, which achieves a higher torque-to-inertia ratio, combined with a polynomial fit command signal 150, improves the duty cycle for sawtooth scanning from the galvo scanners. Further, the implementation of a conventional pulse width modulation (PWM) servo driver for sawtooth scanning substantially reduces the power dissipation in the driver, thus reducing power supply capacity and heat dissipation from the drivers.

Figure 10A:
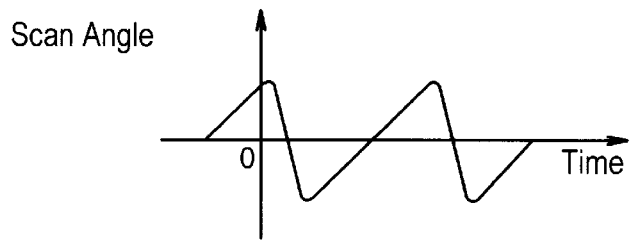
FIGS. 10A and 10B show the angular displacement of a conventional scan motor and the typical current profile used to drive the scan motor, respectively.
Figure 10B:
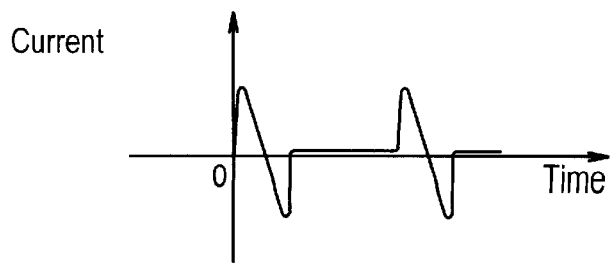

With the eight pole moving magnet motor 102 using the polynomial sawtooth command signal 150, a duty cycle in the range of 80 to 85 percent is achievable at scan rates up to 120 cycles per second. Performance improvement beyond this, however, becomes exponentially difficult. The difficulty in increasing performance is due to the fact that the switching of the high currents at the turn around points causes torque impulses which excite resonances in the scanner and mirror structure resulting in unwanted jitter. FIGS. 10A and 10B show the angular displacement of a conventional scan motor and the typical current profile used to drive the scan motor, respectively. The acceleration profile of the scan motor during the turn around periods has the same shape as the current profile shown in FIG. 10B.

In accordance with an embodiment of the present invention, a nonlinear biasing element is used to oppose the motion of rotor 108. A nonlinear biasing element applies a low resisting torque to the rotor 108 during the active portion of the scan cycle, during which the motor 102 drives the rotor 108. As the rotor 108 moves toward the end of the active portion of the scan cycle, the opposing force from the nonlinear biasing element increases rapidly, thereby supplying part of the deceleration torque required to stop the rotor 108. Consequently, a reduced peak current is required by the motor 102 to decelerate the rotor 108 and provide a cushioned stop at turn around, which reduces jerk. The kinetic energy of the moving inertia of the rotor 108 plus scanning mirror 110 is stored as potential energy in the nonlinear biasing element. The potential energy stored in the nonlinear biasing element is used to provide a portion of energy required to accelerate the rotor 108 plus scanning mirror 110 for the return portion of the scan cycle, again reducing the peak torque requirements from the scan motor 102. At the end of the return portion of the scan cycle, a similar energy exchange between kinetic and potential energy takes place. With the use of nonlinear biasing elements, duty cycles in excess of 90 percent are achievable at scan speeds up to 200 Hz.

Figure 11:
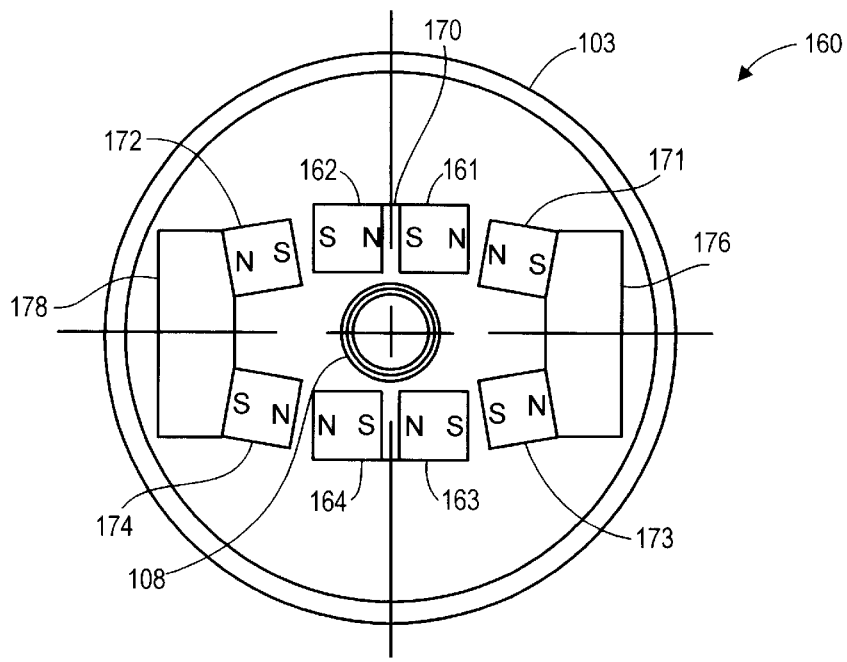
FIG. 11 shows a magnetic spring used as a nonlinear biasing element.

In one embodiment of the present invention, the opposing torque from the nonlinear biasing element is applied to the rotor 108 magnetically. FIG. 11 shows a nonlinear magnetic spring 160 with four permanent magnets 161–164 attached to the two ends of an arm 170 mounted to the rotor 108. Four stationary magnets 171–174 are attached to the motor housing frame 103 via soft iron mounts 176 and 178 and are oriented such that the north and south poles face the same poles of magnets 161–164 attached to the rotor 108.

Figure 12:
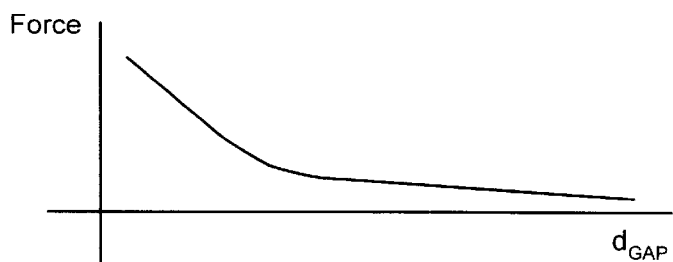
FIG. 12 shows the repelling force of the magnetic spring relative to the size of the gap between the magnets.

The four stationary magnets 171–174 repel the moving magnets 161–164 and hold the rotor 108 in a null or neutral position. When a current is applied to the motor 102, the rotor 108 rotates causing changes in the size of the gaps $d_{GAP}$ between the moving magnets 161–164 and the stationary magnets 171–174. The repelling force between these magnets has a nonlinear relationship to the size of the gaps $d_{GAP}$. As the size of the gap decreases, the repelling force between the magnets increases, as shown in FIG. 12. The force is approximately proportional to the inverse square of the size of the gap $d_{GAP}$.

Figure 13:
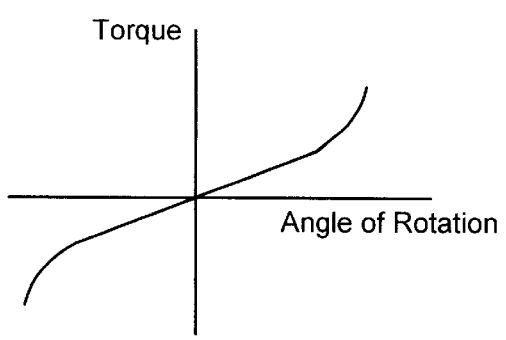
FIG. 13 shows the resisting torque of the magnetic spring as a function of the angle of rotation.

The repelling forces between the stationary magnets 171–174 and the moving magnets 161–164 produce a torque which resists the motion of the rotor 108 from the neutral position. The torque is a function of the force applied by the magnets and the distance R between the center of rotor 108 and the magnets. FIG. 13 shows the resisting torque as a function of the angle of rotation.

Figure 14:
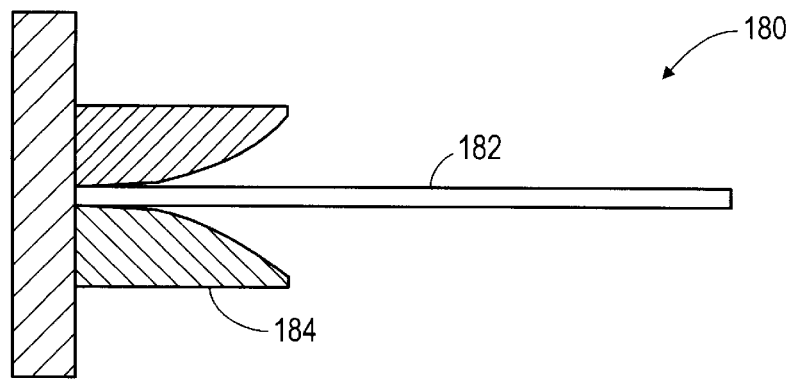
FIG. 14 shows nonlinear mechanical spring with a cantilever member and a shaped clamp.

In another embodiment of the nonlinear biasing element, a mechanical spring is used. FIG. 14 shows nonlinear spring 180 including a cantilever spring member 182 and a shaped clamp 184. The spring member 182 is clamped at one end by shaped clamp 184 and has free movement at the other end. The cross section of the spring member 182 can be any shape, rectangular, circular, tubular, or any other cross section.

The deflection of a conventional spring member is proportional to the applied bending moment. However, with the movement of the spring member 182 constrained at the fixed end with shaped clamp 184, the spring deflection is no longer proportional to the applied moment. The nonlinear spring deflection occurs because the effective length of the cantilever spring member 182 is reduced as the spring member 182 deflects and comes in contact with the shaped clamp 184. Consequently, as the spring member 182 is deflected it becomes increasingly stiff.

Figure 15:
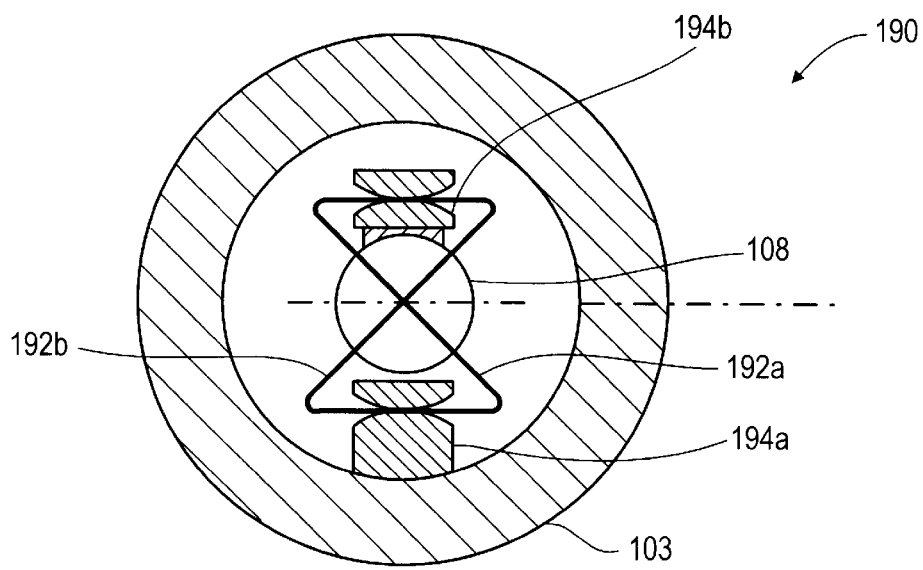
FIG. 15 shows a nonlinear mechanical spring having an "S" shape and used as a nonlinear biasing element.

The nonlinear spring member 182 can be implemented in galvo scanner 100 to apply opposing torque to the rotor through an S-flex cross flexure 190, as shown in FIG. 15. The S-flex cross flexure 190 uses one or more opposing S-shaped springs 192a and 192b bent in one or more places to provide a longer spring length within the space constraints of the small scanner frame 103. One shaped clamp 194a is connected to frame 103, while the other shaped clamp 194b is mounted to the rotor 108. The benefits of the S-flex geometry is described in U.S. Pat. No. 4,732,440, which is incorporated herein by reference. The S-flex geometry lends itself to easy attachment to the rotor 108 and to the frame 103. Also, the shape of the attaching clamps can be customized to provide the desired stiffening characteristics from the spring.

Figures 16A, 16B, 16C:
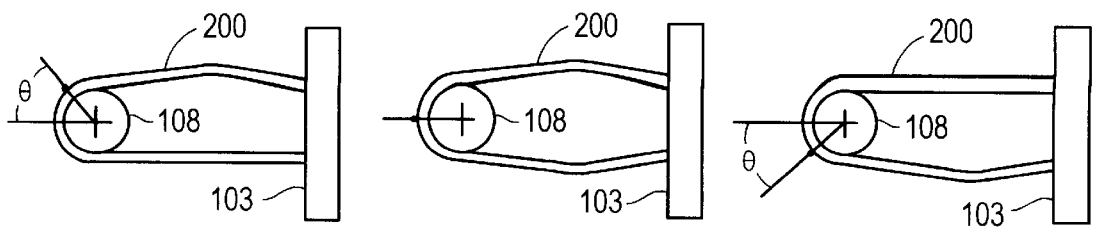
FIGS. 16A, 16B, and 16C show another embodiment of a nonlinear mechanical spring used as a nonlinear biasing element in various states.

In another embodiment, the shape of the nonlinear spring can be customized to wrap around the rotor 108. FIGS. 16A, 16B, and 16C show a nonlinear spring 200 wrapped around rotor 108, in a partial spiral, with the nonlinear spring 200 connected to the frame 103. FIG. 16B shows nonlinear spring 200 in a neutral position, while FIGS. 16A and 16C show nonlinear spring 200 with rotor 108 rotated in a clockwise and counterclockwise position, respectively. As shown in FIGS. 16A–16C, as rotor 108 rotates, the spiral of the nonlinear spring 200 tightens around the rotor 108 thus reducing the effective length of the spring 200 thereby increasing its spring constant.

It should be understood that there are alternative methods of implementing a nonlinear biasing element. For example, a nonlinear spring may include straight cross flexures with shaped clamps, multiple spring members which activate during different portions of the scan cycle, and opposing compression or extension springs which produce nonlinear stiffening force as deflection increases.

While the present invention has been described in connection with specific embodiments, one of ordinary skill in the art will recognize that various substitutions, modifications and combinations of the embodiments may be made after having reviewed the present disclosure. The specific embodiments described above are illustrative only. Various adaptations and modifications may be made without departing from the scope of the invention. The spirit and scope of the appended claims should not be limited to the foregoing description.

What is claimed is:

1. A galvanometric scanning device comprising:
   a moving magnet motor with a rotor having at least four poles; and
   a scanning mirror mounted on said rotor, said motor comprising a plurality of laminations mounted in a stator, said rotor extending through the center of said plurality of laminations, each lamination comprises:
     a body;
     a plurality of teeth uniformly positioned radially around said body and extending inwardly toward the center of said body; and
     a plurality of coils, wherein individual coils are mounted on individual teeth.

2. The galvanometric scanning device of claim 1, wherein half of said plurality of teeth have individual coils mounted thereon.

3. The galvanometric scanning device of claim 1, wherein there are eight teeth.

4. A galvanometric scanning device comprising:
   a moving magnet motor with a rotor having at least four poles; and
   a scanning mirror mounted on said rotor, wherein said motor is driven with a continuous sawtooth command signal.

5. The galvanometric scanning device of claim 4 wherein said rotor has eight poles.

6. The galvanometric scanning device of claim 4 wherein said motor is driven with a polynomial sawtooth command signal.

7. The galvanometric scanning device of claim 6, wherein said polynomial sawtooth command signal is a fourth order polynomial fit in accordance with:

$$\theta = a_0 + a_1 t + a_2 t^2 + a_3 t^3 + a_4 t^4;$$

$$d\theta/dt = a_1 + 2a_2 t + 3a_3 t^2 + 4a_4 t^3;$$

$$d^2\theta/dt^2 = 2a_2 + 6a_3 t + 12a_4 t^2;$$

$$d^3\theta/dt^3 = 6a_3 + 24a_4 t; \text{ps}$$

at $t = 0$; $\theta = \theta_1$; $\dfrac{d\theta}{dt} = V_a$; $d^2\theta/dt^2 = 0$;

at $t = t1$, $\theta = 0$, $d^2\theta/dt^2 = 0$ where $\theta_1$ is maximum scan angle, $V_a$ is the velocity of the scan.

8. The galvanometric scanning device of claim 4 wherein said motor is driven with a cycloidal fit sawtooth command signal.

9. A galvanometric scanning device comprising:
   a moving magnet motor with a rotor having at least four poles;
   a scanning mirror mounted on said rotor; and
   a first bearing and a second bearing, wherein said first bearing supports said rotor and said second bearing is an outboard bearing supporting said mirror.

10. A galvanometric scanning device comprising:
    a moving magnet motor with a rotor having at least four poles;
    a scanning mirror mounted on said rotor; and
    a positioning sensor mirror coupled to said scanning mirror.

11. The galvanometric scanning device of claim 10, wherein said positioning sensor mirror is mounted to said scanning mirror.

12. The galvanometric scanning device of claim 10, wherein said positioning sensor mirror is integrally formed on said scanning mirror.

13. A galvanometric scanning device comprising:
    a moving magnet motor with a rotor having at least four poles;
    a scanning mirror mounted on said rotor; and
    a nonlinear biasing element mounted to said rotor, said nonlinear biasing element providing a nonlinear force to decelerate said rotor and providing a nonlinear force to accelerate said rotor.

14. The galvanometric scanning device of claim 13, wherein said nonlinear biasing element comprises a magnet spring.

15. The galvanometric scanning device of claim 14, wherein said magnetic spring comprises:
    a bar coupled to said rotor, said bar having a first end and a second end approximately equidistant from said rotor;
    a first pair of magnets coupled to said first end on opposing sides of said bar and a second pair of magnets coupled to said second end on opposing sides of said bar; and
    a first pair of stationary magnets opposing said first pair of magnets and a second pair of stationary magnets opposing said second pair of magnets.

16. The galvanometric scanning device of claim 13, wherein said nonlinear biasing element comprises at least one nonlinear mechanical spring.

17. The galvanometric scanning device of claim 16, wherein said at least one nonlinear mechanical spring comprises:
    a cantilever member coupled to said rotor; and
    a shaped clamp mounted to said cantilever member, wherein said shaped clamp is shaped so that as said cantilever member is deflected the effective length of said cantilever member is shortened.

18. The galvanometric scanning device of claim 17 wherein said cantilever member is mounted to a second shaped clamp that is mounted to said rotor, said cantilever member having an "S" shape.

19. The galvanometric scanning device of claim 17, wherein there are two nonlinear mechanical springs.

20. The galvanometric scanning device of claim 17, wherein said at least one nonlinear mechanical spring comprises a member with two ends held stationary, said member coupled to said rotor such that when said rotor is in a neutral position, said member has flexure on both sides of said rotor.

* * * * *